United States Patent Office 3,444,125
Patented May 13, 1969

3,444,125
MOISTENABLE, HOT MELT ADHESIVES COMPRISING RANDOM VINYL ALCOHOL/VINYL ESTER COPOLYMERS
Clarence W. Schimelpfenig, Jr., and Pallatheri M. Subramanian, Wilmington, Del., assignors to E. I. du Pont de Nemours and Company, Wilmington, Del., a corporation of Delaware
No Drawing. Continuation-in-part of application Ser. No. 546,213, Apr. 29, 1966. This application May 11, 1967, Ser. No. 637,632
Int. Cl. C08f 37/00, 45/34; C09j 3/16
U.S. Cl. 260—33.4      5 Claims

ABSTRACT OF THE DISCLOSURE

A moistenable hot melt adhesive composition of a random vinyl alcohol/vinyl ester copolymer and a compatible plasticizer (e.g., glycerine) is provided. The copolymer has about 5–40 mole percent ester units.

RELATION TO OTHER APPLICATIONS

This application is a continuation-in-part application of Ser. No. 546,213, filed Apr. 29, 1966, by Clarence W. Schimelpfenig, Jr., and now abandoned.

BACKGROUND OF INVENTION

This invention relates to adhesives which can be applied an anhydrous molten liquids to paper products such as envelopes, tapes, labels, book pages and spines, stamps and the like and which, after cooling, can be activated to a tacky state by moistening with water or the like.

Presently, remoistenable adhesive compositions comprising dextrin as the chief adhesive ingredient are employed by the envelope industry. These compositions are applied to envelope flaps in solutions, usually in aqueous solutions, are are dried to deactivate the adhesive prior to removal of the envelopes from the adhesive applying machine.

The use of solutions to apply adhesives to paper products has several disadvantages. The drying operation referred to above limits the speed at which the adhesive machine may operate. The solvent, especially when water is employed, carries adhesive into the body of the paper with the result that a greater quantity of adhesive than would otherwise be needed is required. Moreover, when water is employed as the solvent the moisture content of the paper to which it is applied and the ability of paper to evenly gain and lose water with humidity changes are affected; curling of the paper results.

Hot melt formulations, based on copolymers of vinyl acetate and vinyl alcohol, have heretofore failed to find acceptance by the envelope industry. Generally such formulations have been unsatisfactory in their ability to be applied to paper; either their viscosities are too high or their thermal stabilities are too short, or both.

In contrast with the above, the adhesive compositions of this invention avoid the above difficulties normally encountered during application and provide coating which will not prematurely adhere or block during storage, and which will adhere when moistened and applied to another surface in about the same time as the dextrin type adhesive presently commercially available.

SUMMARY OF INVENTION

The moistenable hot-melt adhesive of this invention comprises 95 to 65% by weight "random" vinyl alcohol/vinyl ester copolymers of low to medium molecular weight and 5 to 35% by weight of a compatible permanent plasticizer.

DESCRIPTION OF INVENTION

Before discussing in detail the "random" copolymers of this invention it is though appropriate to discuss generally the difference between "random" copolymers and "group" copolymers.

"Group" copolymers whether linear or branched and also known as ordered and block copolymers have long runs of identical monomer units, one after the other, interspersed with long runs of the other monomer. Such a group copolymer could be represented by the following formula of a polymer chain consisting of A monomer and B monomer:

– – AAAAAABBBBB . . . BBBBBBB
AAAAAAAA . . . AAAAAABBBBB – –

"Random" copolymers whether linear or branched, on the other hand, are characterized in that they contain isolated single monomer units and short runs of a first monomer interspersed with isolated units and short runs of the other monomer. Such copolymers can be represented by the following formula:

– – AABABBBABAAAAABABBABABBBBABABBAA – –

By the term "random" vinyl alcohol/vinyl ester copolymer is meant a copolymer in which the vinyl ester monomer units and vinyl alcohol units are distributed randomly along the carbon-carbon chain or "backbone" and branches, if any, of the molecule. These "random" copolymers differ from the vinyl alcohol/vinyl ester copolymers presently commercially available, which are of the "group" copolymer type and which contain large groups or long runs of vinyl alcohol monomer units in side by side relationship along the carbon-carbon chain of the molecule. These "group" copolymers are characterized in that they are crystalline in nature and have higher melting points than the non-crystalline "random" copolymers of equal molecular weight and the same percentage of vinyl ester units.

The vinyl alcohol/vinyl ester "group" copolymers will melt, but before softening enough to flow readily will discolor from yellow to brown and exhibit viscosity increases characteristic of molecular growth. The vinyl alcohol/vinyl ester "random" copolymers will soften and become fluid at temperatures below their discoloration temperatures, and temperatures at which molecular growth occurs.

For a further discussion of the distinction between "random" copolymers and "block" copolymers see the article by Robert K. Tubbs titled, "Sequence Distribution of Partially Hydrolyzed Poly(vinyl Acetate)," appearing in the Journal of Polymer Science: Part A–1, vol. 4, 623–629 (1966) which is included herein by reference.

The random copolymers of this invention contain from about 5 to about 40% (percent on a molar basis) of vinyl ester units with the remainder of the units being substantially vinyl alcohol units. Generally, the higher the molecular weight of the copolymer, the higher will be the percentage of vinyl ester units desired. The copolymer is preferably made by esterifying a polyvinyl alcohol which, in turn, has been made by hydrolyzing or alcoholizing a polyvinyl ester. The hydrolysis or alcoholysis of the polyvinylester is generally continued until 87 to 100% of vinyl ester units have been converted to vinyl alcohol units. Preferably, the polyvinyl ester is fully hydrolyzed or alcoholized, i.e., 99 to 100% of the vinyl ester units are converted to vinyl alcohol units. The number of vinyl ester units left in the polymer during hydrolysis or alcoholysis should not constitute more than about ⅓ the total number of vinyl ester units desired in the polymer after the subsequent esterification, which forms the "random" copolymer. Copolymers containing this relative amount of vinyl ester units from the two sources are meant to be included within the term "random" copolymers, as used throughout the specification to describe and to claim the polymers used in the adhesive compositions of this invention. These copolymers could be represented by the following formula, wherein the vinyl ester units not removed by the hydrolysis or alcoholysis are denoted by the letter B', the vinyl alcohol units by the letter A, and the vinyl ester units placed in the molecule by esterifying vinyl alcohol units by the letter B:

--AAAB'B'B'B'ABAAAAABBAAAAABB
AAAAABAAABABAAAABBAAABAAAAAB--

The molecular weights of the "random" copolymers usable in this invention are generally within the range of about 1,600 to about 18,000, with the preferred copolymers having molecular weights adjacent this lower limit. The low limit of this range is defined by the plastic quality of these copolymers and excludes copolymers which are cheesy in nature, i.e., copolymers which are crumbly at room temperature and lack sufficient strength to withstand the force necessary to form a paper or fiber tearing band. The upper limit of this range is defined by the ability of the copolymers plasticized as described hereinafter, to form an adhesive which exhibits a viscosity of no greater than about 48,000 centipoises at an application temperature above about 100° C.

The adhesive compositions of this invention have viscosities of 48,000 to 4,000 centipoises (as measured with a Brookfield Viscometer using a number seven spindle at 100 r.p.m.) at application temperatures within the range of 100° C. to 140° C. Of these compositions, those which have viscosities within the range of about 16,000 to 6,000 centipoises at application temperatures of 110° C. to 130° C. are preferred. The most preferred compositions have viscosities of about 12,000 centipoises at application temperatures of 120° C. The compositions within the preferred range can be used with existing envelope adhesive coating machinery modified to include heated adhesive reservoirs. In addition, the thermal stability of these compositions is, for practical purposes, unlimited.

While any of a number of polyvinyl esters, such as polyvinyl butyrate, may be employed to form the polyvinyl alcohol from which the "random" copolymer is formed; polyvinyl acetate commercially available in large quantities is preferred. This preferred polyvinyl ester is preferably converted to polyvinyl alcohol by methoxide catalyzed alcoholysis with methanol. The esterification of the polymer can be achieved through the use of any monocarboxylic 1–5 carbon atom acid or mixture thereof. Substitute acids, such as glycolic acid and lactic acid, may be employed as desired. The preferred acid, however, is acetic acid which converts vinyl alcohol units to vinyl acetate units. The use of branched chain 4 and 5 carbon atom acids reduces the tendency of the adhesive to prematurely adhere or block during storage under pressure and decreases the time interval needed to form a fiber tearing bond after the adhesive has been wetted and pressed against the substrate to which it is to adhere.

The plasticizers used in conjunction with the "random" copolymers above described must be compatible therewith, i.e., the plasticizer and copolymer must be soluble one in the other, in the amounts employed. Generally, the plasticizer constitutes from 5 to 35% by weight of the adhesive composition, with amounts within the range of 10 to 25% by weight being preferred. Compositions constituted of about 15% by weight plasticizer, are the most preferred compositions. The plasticizer, in addition, must be of a low molecular weight or, otherwise, be so constituted that the adhesive composition containing the same will exhibit a lower viscosity than would be observed in the absence of such plasticizer. Finally, the plasticizer must have a high boiling point and high decomposition temperature, i.e., both above about 220° C., so as not to evaporate from the container or decompose in the container used to store the adhesive, in readiness for its application to the substrate on which it is to be used. The following list includes plasticizers which can be used: dimethyl phthalate, glycerine, tris(tetrahydrofurfural) phosphate, diethyl tartrate, sorbitol, triethylene glycol, diethylene glycol, monoacetin, urea, Santicizer 8 (a mixture of N-ethyltoluene sulfonamides), butyl Carbitol [2-($\beta$-butoxyethoxy)ethanol], caprolactam, and 1,4-butanediol. Of these plasticizers, glycerine is preferred.

Other ingredients, including extenders such as compatible polymers, setting promoters such as kaolin and diatomaceous earth, antioxidants such as hydroquinone, butylated hydroxyanisole (Tenox BHA), butylated hydroxytoluene (Tenox BHT), preservatives to prevent bacterial or fungal growth, as well as fugitive plasticizers such as dimethyl formamide, N-methyl-pyrrolidone, butyl cellosolve, and propylene glycol may be added in minor amounts as desired. Such ingredients will not generally be required. The use of fugitive plasticizers should, for example, only be needed to correct temporary high viscosities as, for example, when restarting an adhesive applying machine after shut-down.

Hereinbelow is set forth the method of formulating the preferred adhesive composition and several examples of its use.

Example 1

Fully hydrolyzed polyvinyl alcohol having an inherent viscosity of 0.13 and a molecular weight of approximately 1,500 in the amount of 1,500 grams, was combined with 2,430 milliliters of distilled water and 5,160 milliliters of glacial acetic acid, and was heated to reflux for 22 hours. The mixture was then cooled and the polymer isolated by pouring the mixture into a vessel containing acetone, a polymer non-solvent, and equipped with a high speed stirrer. Batches of 500 milliliters of the reaction mixture were poured into 3,000 milliliters batches of acetone. The polymer precipitated from the solution, and was recovered and dried. The recovered polymer weighed 1,234 grams, had a saponification number of 254, and exhibited an inherent viscosity of 0.12. (The inherent viscosity in all instances was measured in the standard manner at 30° C., using a 1% aqueous solution of the polymer being measured.) Approximately 24.6 mole percent of the vinyl alcohol groups were converted to vinyl acetate groups by the above treatment. The copolymer was readily water soluble.

The vinyl alochol/vinyl acetate random copolymer prepared as above described in the amount of 85 parts by weight was mixed with 15 parts by weight glycerine, and stirred and heated until a transparent solution formed. This adhesive composition exhibited, a viscosity of 4,240 centipoises at 140° C., 6,040 centipoises at 130° C. and 11,800 centipoises at 120° C.

This adhesive was heated to 130° C. and applied to a 20 lb. weight white wove paper in the amount of 11.5 lbs. per 3,300 square feet of paper surface area. The coated paper was conditioned for 24 hours at 73° F. (23° C.) and 50% relative humidity, and was then licked and immediately placed in contact with another piece of similarly conditioned 20 lb. weight white wove paper. The adhesive set in less than 10 seconds in all instances. A majority of the samples set in less than 5 seconds.

The coated paper did not stick to an uncoated piece of the same paper stock during 18 hours at 73° F. (23° C.) and 50% relative humidity, under a pressure of two pounds per square inch. At 140° F. (60° C.) and 0% relative humidity, and the same pressure and time, other samples of the same coated paper and uncoated paper, did not stick together.

Having described the invention above for purposes of illustration and not limitation, what is claimed is as follows:

1. A thermally stable adhesive composition having a Brookfield viscosity between about 48,000 and 4,000 centipoises, at a temperature within the range of 100° C. and 140° C. consisting essentially of (A) 95 to 65% by weight of a random vinyl alcohol/vinyl ester copolymer having about 5–40 mole percent ester units with the ester moiety of said units having 1–5 carbon atoms and (B) 5 to 35% by weight of a compatible permanent viscosity lowering plasticizer, the molecular weight of the random copolymer being about 1600 to about 18,000 and said plasticizer having a boiling point and decomposition temperature above about 220° C.

2. The adhesive composition of claim 1 wherein said random copolymer is a vinyl alcohol/vinyl acetate copolymer.

3. The adhesive composition of claim 1 wherein said plasticizer is glycerine.

4. The adhesive composition of claim 1 wherein the viscosity of the composition is between about 16,000 to 6,000 centipoises, at a temperature within the range of 110° C. to 130° C.

5. The adhesive composition of claim 1 wherein the viscosity of the composition is about 12,000 centipoises at 120° C.

References Cited

UNITED STATES PATENTS

| | | | |
|---|---|---|---|
| 3,296,018 | 1/1967 | Sullivan | 117—122 |
| 2,755,252 | 7/1956 | Fong. | |
| 3,329,664 | 7/1967 | Tsuda. | |
| 2,226,075 | 12/1940 | Rowe. | |

MORRIS LIEBMAN, *Primary Examiner.*

H. H. FLETCHER, *Assistant Examiner.*

U.S. Cl. X.R.

260—30.4, 31.8, 32.6, 91.3